(12) United States Patent
Cormode et al.

(10) Patent No.: US 8,589,443 B2
(45) Date of Patent: Nov. 19, 2013

(54) METHOD AND APPARATUS FOR PROVIDING ANONYMIZATION OF DATA

(75) Inventors: Graham Cormode, Morristown, NJ (US); Balachander Krishnamurthy, New York, NY (US); Divesh Srivastava, Summit, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 452 days.

(21) Appl. No.: 12/427,448

(22) Filed: Apr. 21, 2009

(65) Prior Publication Data

US 2010/0268719 A1 Oct. 21, 2010

(51) Int. Cl.
*G06F 7/00* (2006.01)
(52) U.S. Cl.
USPC .......................................... 707/784
(58) Field of Classification Search
USPC ................... 707/784, 828, 825, 758
See application file for complete search history.

(56) References Cited

U.S. PATENT DOCUMENTS

| 5,199,083 | A * | 3/1993 | Takeda ........................ 382/180 |
| 2004/0199781 | A1 | 10/2004 | Erickson et al. |
| 2009/0089291 | A1 * | 4/2009 | Daily et al. ........................ 707/9 |
| 2009/0112867 | A1 * | 4/2009 | Roy et al. .......................... 707/9 |
| 2009/0303237 | A1 | 12/2009 | Liu et al. |
| 2010/0114840 | A1 * | 5/2010 | Srivastava et al. ............. 707/688 |
| 2010/0268719 | A1 | 10/2010 | Cormode et al. |

OTHER PUBLICATIONS

Tiancheng Li, et al., "Injector: Mining Background Knowledge for Data Anonymization", ICDE 2008, pp. 446-455.
Qing Zhang, et al. "Aggregate Query Answering on Anonymized Tables", ICDE 2007, consists of 10 unnumbered pages.
Edman et al. IEEE—2007 Combinatorial Approach to Measuring Anynomity, consists of 8 pages.

* cited by examiner

*Primary Examiner* — Truong Vo (57) ABSTRACT

A method and apparatus for providing an anonymization of data are disclosed. For example, the method receives a communications graph that encodes a plurality of types of interactions between two or more entities. The method partitions the two or more entities into a plurality of classes, and applies a type of anonymization to the communications graph.

20 Claims, 4 Drawing Sheets

METHOD AND APPARATUS FOR PROVIDING ANONYMIZATION OF DATA

The present invention relates generally to data processing and, more particularly, to a method and apparatus for providing anonymization of data, e.g., graph data, social network data and the like.

BACKGROUND OF THE INVENTION

The recent rise in popularity of social networks, such as Facebook of Palo Alto, Calif., and MySpace of Santa Monica, Calif., has created large quantities of data about interactions of individuals within such networks. The data is often organized and kept in records for ease of access by multiple users or applications. When the data is organized in electronically accessible records, it is managed and updated by computers. These electronically accessible records can be stored into operational databases. Users and applications can then query these operational databases to access the data. However, the data contain many private details about individuals. The network service provider may then be expected to anonymize the data prior to making it more widely available for users, e.g., for scientific research. One method for anonymizing the graph data is removing all non-graph information and adding or deleting some edges. Since social network data is richer in details about the users and their interactions, loss of details due to anonymization limits the usability of the data for analysis.

SUMMARY OF THE INVENTION

In one embodiment, the present invention discloses a method and apparatus for providing an anonymization of data. For example, the method receives a communications graph that encodes a plurality of types of interactions between two or more entities. The method partitions the two or more entities into a plurality of classes, and applies a type of anonymization to the communications graph.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Many sets of data are naturally represented as graph structures, with a variety of different types of links connecting sets of entities in the graph. One example of this is presented by Online Social Networks (OSNs). OSNs allow users to identify other users as "friends", to exchange messages and comments, to post and subscribe to blogs, and to play games among themselves. Currently, OSNs have over half a billion active users, with some exceeding 100 million members. There are numerous specialized OSNs catering to professionals, seniors, writers and students, amongst many others. There are many analytical and sociological questions that can be answered using the data encoded in these systems. For example, one may wish to share the data for scientific research purposes. However, the raw data contained in such networks is particularly sensitive, because it contains personal details entered by the users, and sensitive connections between them. The personal details and sensitive connections among users are not intended for public use and should not be revealed. Hence, the network service providers may wish to anonymize such data to guarantee privacy of data subjects while simultaneously maximizing the utility of the resulting anonymized data.

One approach is performing anonymization using k-anonymization. However, naively applying k-anonymization does not yield useful results on graph structured data. Another approach is representing the data as a simple graph of nodes and edges. However, the real data sources are typically much richer than this and much more valuable to researchers. Taking OSNs as a motivating example, the main entities in the data are individuals who create profiles for themselves. These profiles may list lots of demographic information, such as age, sex and location, as well as other personal data such as political and religious preferences, relationship status, favorite music, books, destinations and cuisines. Between users in an OSN, there are many different kinds of interactions.

A common interaction is for a pair of people to indicate that they are "friends", thereby allowing each user to see more information about the other, and to receive news of updates. Messages may be exchanged between friends via internal email or instant messaging. Interactions may also involve more than just two participants, e.g., messages may be sent to several people; games may be played between several players, many users may subscribe to blogs, or larger groups may be formed for almost any purpose. Such complex sets of interactions cannot be easily represented solely by simple graphs of nodes and edges with no further information. The connections formed in the social networks may be referred to as "rich communication graphs" emphasizing that such graphs contain rich set of data, based on the communications between different entities.

This type of rich data brings its own challenges. The queries on a social network may have variations and may be based on the interests of the various users, e.g., the interests of researchers issuing the queries. In one example, a query may be to determine how many users are there in specific subpopulations, e.g., in age ranges, locations, with certain political viewpoints, etc.

In one example, the query may be to determine the patterns of communication and friendship, and/or to identify subpopulations that are communicating. A query to determine the pattern of communication may be to determine the frequency of communication, the time of communication (e.g., to determine the time of day, day of week, month of year of communication).

In one example, the query may be to determine if the graph of interactions can be partitioned with small cuts. Small cut refers to when there may be few links between users from different continents, different political viewpoints, and so on. In that case, the graph structure may be characterized by a collection of sub-graphs. In one example, the query may also be to determine if the collection of sub-graphs have identifiable properties.

In one example, a query may be issued to determine whether the communication patterns are changing over time. If the communication patterns are changing, a query may also be issued to determine how the distribution of communication between subpopulations is shifting over time.

In one example, a query may be issued to determine what can be learnt about the use of applications (such as games) in the network. For example, a product vendor may be interested in determining how the popularity of a product spreads over time and whether the pattern of spreading is correlated with friendship links.

The above examples of queries can be answered exactly using the original data, but there are simply too many of such possible queries and variations for the data owner to precompute and release all possible answers. Moreover, it is not possible to anticipate all possible queries which may be of interest to analysts.

In one embodiment, the current method provides an anonymization method so that these queries, and other similar ones, may be answered accurately using the resulting anonymized data set that can be published. Observe that these queries are not simply about properties of the entities in the data, or simply about the pattern of the link structure in the graph, but rather on their combination.

It is realized that it is important for the anonymization method to mask the associations between entities and their interactions (for protecting the privacy of the individuals) but not to obscure them entirely; as such queries may need to be answered with some degree of accuracy. Furthermore, the anonymization method needs to be usable for rich communication graphs, such as graphs that represent Online Social Networks (OSNs).

In one embodiment, the current method provides a set of techniques for anonymizing social network data based on grouping the entities into classes, and masking the mapping between entities and the nodes that represent them in the anonymized graph. The techniques enable queries over the data to be evaluated with a high level of accuracy, while guaranteeing resilience to certain classes of attack. The method also prevents inference of interactions from the graphs by providing a safety condition to be applied while partitioning the nodes into classes.

In one embodiment, the method first encodes multiple types of interactions between entities using a flexible representation of rich communication graphs. The encoding is applicable to interactions which involve large numbers of participants (not just pairs). For example, a rich communication graph G may encode a variety of interactions between a set of entities V. In the case of an online social network, V may represent the members of the network. The interactions between them can be, for instance, that an email or IM was sent between a pair, a game was played among four players, or a large group declared their support for a political candidate. These interactions may be represented by a hypergraph, where each hyperedge consists of the set of entities involved in that interaction. Note that this representation captures the special case of (directed or undirected) graphs, which are hypergraphs in which each hyperedge is constrained to linking exactly two nodes.

In one embodiment, the method represents such rich communication graphs as bipartite graphs over the sets V and I. Each node in I corresponds to an interaction between a subset of entities from V. An edge $(v \in V, i \in I)$ indicates that the entity represented by node v participates in interaction i. Each entity (corresponding to a graph node) has an identity (such as a user id) and a set of properties. For example, user properties in an OSN may include demographic information (such as geographic location, sex, date of birth) and other data (e.g. OSN join date). Similarly, each interaction between two or more entities may have an identity and a set of properties. For example, each "friend" relation may include static properties (e.g., creation date) and may also have dynamic properties (e.g., a number of times the friends communicate).

In one embodiment, the method ensures that each piece of information appears only on one "side" of the interaction graph. For example, if two entities that are friends each record their location, then the method does not allow the friendship interaction to also record the location of the friends. This is because, recording the location of the friends may aid an attacker in matching up interactions with entities (discussed below).

Figure 1:
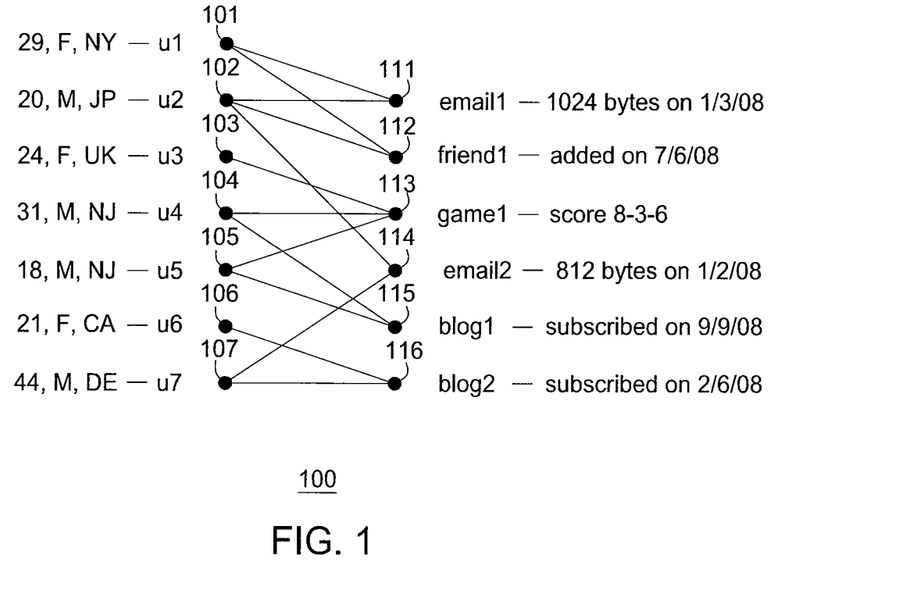
FIG. 1 illustrates a hypergraph of entities related to the current invention.

FIG. 1 illustrates an illustrative hypergraph 100 of entities related to the current invention. For example, the hypergraph 100 comprises user entities 101-107 and interaction entities 111-116. The users engage in different interactions in various combinations: some exchange email messages, establish a 'friendship' relation, subscribe to each others' blogs, and so on. The user entities 101-107 and interaction entities 111-116 are linked to their respective properties. For example, the user entities 101-107 are linked to age, sex and location as properties of users. Similarly, the interaction entities 111-116 are linked to other relevant properties for interactions, e.g., number of bytes, date of communication, subscription date for communication, and so on.

In order to analytically define the problem, first let G represent an interaction graph over nodes V and I, and edges E. The problem may then be formulated as a problem to produce an interaction graph G', wherein G' is an anonymized version of G. G' retains many properties of G while limiting the amount of information that is revealed. Furthermore, the privacy condition should hold even under attack from an adversary who knows some limited information about the original graph. Hence, given G', the solution should be such that an attacker with a partial knowledge of G may not be able to infer additional linkages between other nodes. In one embodiment, the properties to be protected and the properties to be preserved may be determined based on the application and/or assumptions about the background knowledge of a potential attacker seeking to break the privacy of one or more users.

In order to more clearly describe the current invention, the method first distinguishes between a node in the graph $v \in V$, and the corresponding entity $x \in X$. Each entity x may have a number of attributes, such as age, location, and an identifier. The true label of node v may then be denoted by x(v).

In one embodiment, the table containing entity attributes may be anonymized up to an appropriate level via standard k-anonymity or permutation-based methods. However, the method makes no assumptions about the entity attributes in providing privacy for the entity to entity interactions.

In the unanonymized graph G, the mapping from nodes v to entities x is completely undisguised. In the unlabeled version of G, the mapping from nodes v to entities x is completely hidden. The goal is then to determine a setting where the mapping is partially revealed to allow non-trivial queries to be computed over the data without exposing the complete data. In one embodiment, the utility of the mapping may be judged based on the quality with which various queries may be answered on the anonymized graph. Clearly, some queries cannot be answered with high accuracy without compromising privacy.

For example, for a query that is so specific that it identifies two unique entities and asks for the graph distance between them, an accurate answer would reveal whether they are linked. So the goal is to give accurate answers on queries that are not privacy revealing, and to tolerate some degree of inaccuracy for answers in other cases.

In one embodiment, the privacy requirements related to an attacker being able to learn interactions between entities may be selected based on the application. In one example, the privacy requirement may be that an attacker should not be able to learn any information about interactions beyond what the attacker already knows. In one example, the privacy requirement may be that the attacker may learn about some types of interaction but not others. In one example, the privacy requirement may be that the attacker may learn about interactions between pairs of individuals who are known to the attacker, but not about any interactions involving others (corresponding to the case in some OSNs such as LinkedIn where users can see the connections between their friends).

In one embodiment, the method addresses privacy requirements limiting only positive inferences, e.g., determining if two users did send a message to each other. In other words, the method may allow some negative inferences, e.g., learning that two users have never communicated. This is analogous to tabular data, such as used in an anonymized medical database. For example, an attacker, using a tabular data for an anonymized medical database, may not be able to determine which of a set of diseases a particular individual suffers from (i.e., positive inferences), but may be able to rule out certain diseases (i.e., negative inferences).

In one embodiment, the current method performs anonymization on the encoded multiple types of interactions described above, based on first partitioning the original entities into classes, and then analyzing whether the ability of an attacker to infer additional information is either zero or minimized. The analysis of whether an attacker can infer additional information may depend on the background knowledge available to the attacker.

In one embodiment, the method performs anonymization using a partitioning approach that partitions the entities into classes and then describes the number of interactions at the level of classes, rather than nodes. This partitioning method is resilient to attacks based on greater amounts of background information, but has lower utility since less is revealed about the graph structure.

In one embodiment, the method performs anonymization using a label list approach that allocates a list of labels to each node in the graph, among which lies its true label. The list of labels is structured to ensure that the true label cannot be inferred. That is, the list of labels is selected systematically in steps by first partitioning the nodes into classes, and then by generating and assigning the label lists to nodes. The method also provides a safety condition to ensure that the link structure between classes does not leak information.

In the label list approach, the method provides a list of possible labels for each node in V, among which the true label is guaranteed to lie. The output of a label list anonymization may then be a bipartite graph G' on vertices V and the original set of interactions I that is isomorphic to the input graph G, so that the (structural) properties of the unlabeled graph are unaltered. In addition, the output may include a function l from V to P(X) (the power-set of entities X), so that l(v) is the list of possible labels of v. The true label of v is included in its list, so that $x(v) \in l(v)$. Thus, the unanonymized graph is given by setting $l(v)=\{x(v)\}$, and the unlabeled graph is given by setting $l(v)=X$.

Figure 2:
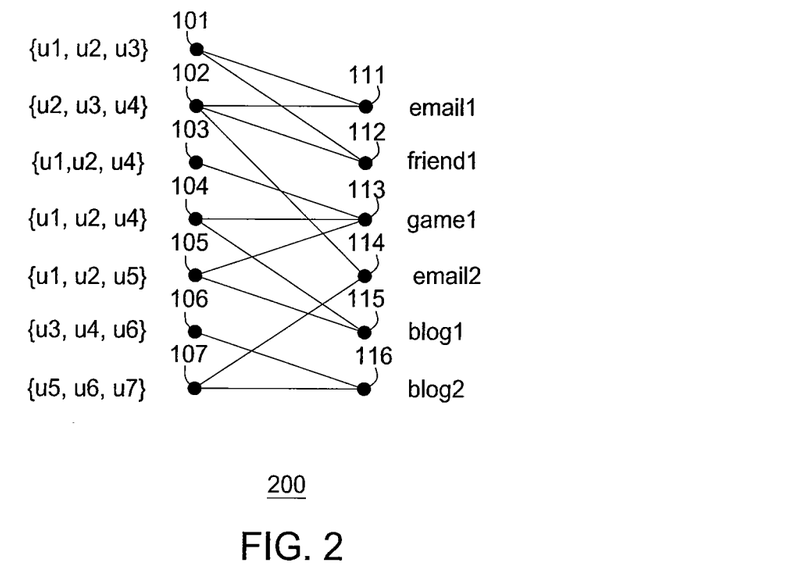
FIG. 2 illustrates an arbitrary label list example.

FIG. 2 illustrates an arbitrary label list example 200. The user and interaction entities are as illustrated in FIG. 1. The first node (user entity 101) in V has the label list $\{u_1, u_2, u_3\}$. Its true label, $x(v)=u_1$, is included in the list. Nodes in I (interaction entities 111-116) are labeled only with their true identity.

On first glance, it might appear that given such a set of arbitrary lists, it is impossible for an adversary to disentangle which is the true label associated with each entity. However, there are cases which do leak information, motivating the current method to allow only a subclass of lists with guaranteed security properties. For example, without restrictions on the lists, it may be possible for an adversary to deduce information without any background knowledge. For example, the label $u_7$ only appears for the last node (user entity 107), revealing its identity. For the first four nodes, only the four labels $\{u_1, u_2, u_3, u_4\}$ are used in various permutations. Therefore, since every node corresponds to a unique entity, these identities must belong to the first four nodes. In particular, they cannot be the identities of the fifth or sixth node. Therefore, the fifth node must be $u_5$ and the sixth node $u_6$, and so one can deduce that $u_6$ and $u_7$ share the $blog_2$ interaction.

In one embodiment, the current method uses guidelines for restricting the lists. In one embodiment, the guideline may comprise one or more of:

containing at least k labels for each list, wherein k is a parameter, to ensure that several inferences must be made before a node identity is revealed;

ensuring that each label appears in at most k different lists, when all lists have length k; and avoiding assigning a set of labels to a set of nodes that have a dense interconnection pattern since this may allow inferences to be made.

The above guidelines are clearly necessary but the approach of using guidelines with arbitrary lists still fails to provide a guarantee of privacy. In one embodiment, the current method uses a restricted class of lists that provide properties to foil inference. That is, instead of allowing arbitrary label lists, the method uses a restricted class of lists.

In one embodiment, the current method uses a search procedure that is based on a uniform list. For a uniform list approach, the nodes V are partitioned into subsets (classes) $C_j$ of size (at least) m. For each set of nodes $C_j$, a collection of m label lists is formed based on an integer "pattern" $p=\{p_0, p_1 \ldots p_{k-1}\}$, which is a subset of $\{0 \ldots m-1\}$ of size exactly k. If the entities' labels are $u_0 \ldots u_{m-1}$, then the label lists generated from p for $0 \le i < m$ are list $(p,i)= \{u_{i+p_0 \bmod m}, u_{i+p_1 \bmod m}, \ldots u_{i+p_{k-1} \bmod m}\}$. Without a loss of generality, one may assume that the pattern p includes 0, since any pattern $p=\{p_0, p_1, \ldots p_{k-1}\}$ generates the same set of lists as $p'=\{0, p_1-p_0 \bmod m, \ldots p_{k-1}-p_0 \bmod m\}$. For example, given nodes $u_0, u_1, u_2, u_3, u_4, u_5, u_6$ and the pattern 0, 1, 3, label lists may be formed as:

$\{u_0, u_1, u_3\}$ $\{u_1, u_2, u_4\}$ $\{u_2, u_3, u_5\}$ $\{u_3, u_4, u_6\}$
$\{u_4, u_5, u_0\}$ $\{u_5, u_6, u_1\}$ $\{u_6, u_0, u_2\}$

In one embodiment, the current method provides two special cases of uniform lists: prefix pattern and full pattern.

The prefix pattern refers to lists defined by the pattern $p=\{0, 1, 2, \ldots k-1\}$. These patterns have a symmetric structure that aids in subsequent analysis. Note that, up to relabeling of the nodes, prefix patterns are equivalent to certain other patterns. When the pattern is generated by an arithmetic progression over the finite integer group (with addition) of size m—for example, pattern $p=\{0, 2, 4\}$ applied to $u_0, u_1, u_2, u_3, u_4, u_5, u_6$ is equivalent to cyclic pattern $p'=\{0, 1, 2\}$ applied to the relabeled set of nodes $u_0, u_2, u_4, u_6, u_1, u_3, u_5$.

The full pattern refers to lists with k=m and so the only possible pattern is $p=\{0, 1, 2, \ldots m-1\}$. In this case, each label list in a class is identical, and consists of all labels of nodes in that class. This can also be seen as a special case of a prefix pattern. The effect is to partition the nodes V into subsets, so that every node in the same subset S is given the same set of labels l(v)=l(S). By the requirements on l(v), this means that l(S) ⊇ x(S), i.e. the list includes all the labels of the nodes in the subset.

Figure 3:
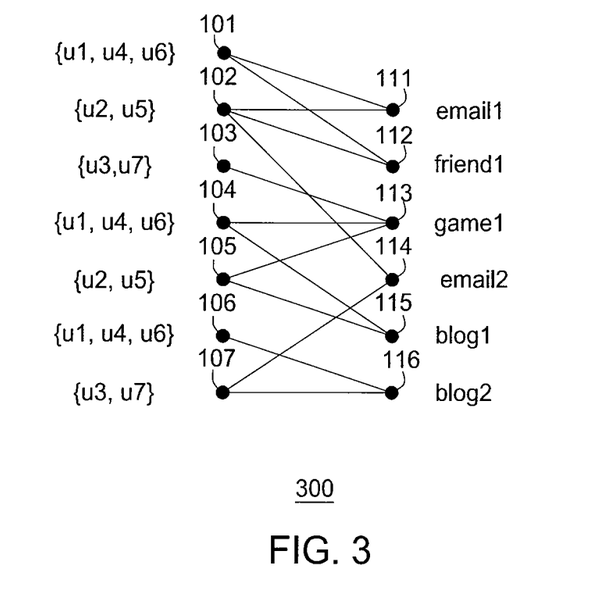
FIG. 3 illustrates a full pattern list example.

FIG. 3 provides a full pattern list example 300. The user and interaction entities are as shown in FIG. 1. In FIG. 3, the classes on V are $\{u_1, u_4, u_6\}, \{u_2, u_5\}$ and $\{u_3, u_7\}$. The nodes of I are placed into classes of size m=1, i.e. they each contain just a single node. Subsequently, the method uses the term (k, m)-uniform list to refer to lists generated over classes of size (at least) m with a pattern of size k.

The two parameters (m and k) clearly affect the tradeoff between privacy and utility: a (1,1) uniform list associates each node directly with the corresponding entity, allowing full utility but no privacy; a (|V|,|V|) uniform list associates each node with the list of all possible labels, and represents an extreme (within this model) of minimal utility and maximal privacy. The choice of the parameters k and m may then depend on the data and the degree of privacy desired.

In one embodiment, in order to prevent various attacks on the anonymized data, the method additionally ensures that certain properties hold on the induced partitions. In order to clearly describe prevention of various attacks, a class safety property is first defined as follows:

A set of (k,m)-uniform label lists satisfies the Class Safety property if for any node v∈V, v participates in interactions with at most one node in any class S ⊂ V. That is, $\forall \{v,i\},\{w,i\},\{v,j\},\{u,j\} \in E: w \in S \wedge u \in S \Rightarrow u=w$.

It is easy to verify that the class safety property holds in the example shown in FIG. 3. A consequence of this requirement is that if S is the class of v itself, then v can have no interaction with any other node in the same class; that is, $\forall \{v,i\},\{w,i\} \in E: v \in S \wedge w \in S \Rightarrow v=w$. The above definition allows two nodes to share multiple interactions (e.g., to participate in a friendship interaction and an email interaction), but the definition prohibits a division into classes such that an entity has multiple friends in the same class. This has implications for when it is possible to choose uniform lists that satisfy class safety. For example, if there is a single entity which has interactions with every other entity, then it is not possible to achieve class safety for any m>1.

In practice, such entities either do not occur, or are outliers which can be ignored. The density of the interaction structure is defined as the fraction of the pairs of entities which are linked by some interaction (out of the $|V|^2$ possible pairs). If the density exceeds 1/m, it is not possible for the safety condition to hold, since some pair of interacting entities must be in the same class. But in real social networks the observed density is dramatically smaller: typically, a user interacts with fewer than 100 other entities, out of the millions of possibilities.

The class safety requirement is chosen to ensure that an adversary cannot make any inferences about interactions between nodes from the anonymized data alone. For example, in FIG. 1, suppose $u_1$ and $u_2$ are placed in the same class of size 2. Then, it is clear that $u_1$ and $u_2$ are friends and they emailed each other, even without knowing exactly which node in the graph corresponds to $u_1$ and which corresponds to $u_2$. This inference is possible because the choice of groups made the sub-graph involving these nodes "dense", which implied that there must be a link. The safety property ensures that such inferences are not possible; and more strongly, that even if additional information is learned, certain properties still hold on the remainder of the graph.

Under the above constraints, the security of the resulting anonymization against an adversary who learns some values of l(v) is guaranteed. Specifically, an attacker who observes data published using the (k,m)-uniform list approach and who has no background knowledge about the original data can learn nothing about which entities have participated in an interaction with certainty, provided k>1. Furthermore, an attacker who observes data published using the (k,m)-uniform list with a prefix pattern, and is able to use background knowledge to find the true identity of a small number (fewer than k−1) of the nodes can learn no information about interactions of nodes whose identity is not known. Thus, given the true identity of a node in the graph and data anonymized using the (k,m)-prefix pattern approach, an attacker can see exactly which interactions it was a part of (e.g. how many emails were sent, how many friends are listed), but no further information about interactions can be revealed-in particular, without further background information or assumptions, they cannot deduce to whom the emails were sent, or with whom the friendships were made. Furthermore, under related models of background knowledge, the impact on the security of uniform list anonymizations can also be limited. The desired minimum security required thus guides the choice of the value of k (and consequently m). For some applications, it is sufficient to ensure that each entity is classed together with a small number of others, say 5 or 10; in other applications, higher privacy requirements may lead to larger values of k from 20 to 50 or higher.

In one embodiment, the step of partitioning the nodes into classes does not require any property of the labels attached to the nodes within the class. It only restricts the interactions which connect nodes across classes. Further, this depends only on the graph structure linking nodes. So the process can focus on partitioning the nodes into classes of size (at least) m without yet considering how to generate the label lists within these classes.

In one embodiment, a simple greedy approach may be used to pick one entity to start the first class. Then the method may insert each node v in turn, in the first class that has fewer than m members, provided that performing this insertion would not violate the safety condition. Conformance to the safety condition may be checked by ensuring that each node that participates in an interaction with v does not participate in an interaction with a node already in the class under consideration. If no class can be found which satisfies this condition or all classes defined have at least m members, then a new class containing only v may be started. Trivially, this class must satisfy the safety condition. The checks may be made efficiently by first maintaining, for each class, a list of all nodes which have an interaction with any member of the group. When testing whether it is safe to insert v, the method may then verify that neither v nor any w that shares an interaction with v is present in the list.

In practice, this approach has many degrees of freedom, which may be used to improve the utility of the resulting anonymization. Queries which involve selections on entity attributes (e.g., selecting users located in Japan) will be unsure exactly which nodes these correspond to. But if (almost) all entities in a class have the same value on this attribute, then this reduces the uncertainty in the query answer, since either all nodes in the class are selected by the query, or else none of them are selected. Such groupings can be created in the anonymized data, subject to satisfying the safety condition. Given a workload describing which attributes are seen as most important for querying (e.g., location first-followed by age), the input may be sorted under this ordering of attributes. The above greedy partitioning may then be performed on the resulting list of entities.

This will tend to place nodes that are adjacent in the ordering in the same class, unless this would violate safety. Note that "structural" attributes, such as the total degree of the nodes, or the number of emails sent, may also be incorporated in this scheme for cases that anticipate a large number of queries based on such graph features.

In one embodiment, once the nodes are partitioned into classes, it remains to allocate the set of label lists to nodes in each class. Each node must be assigned a list which includes its true label. Schemes that are completely predictable should be avoided; else an attacker who learns part of the mapping could reverse engineer the remainder. The anonymization may reveal certain information about the mapping from the node IDs to the entity IDs, and about the links between nodes.

The above label list anonymization may be modeled as a matching problem on a bipartite graph with m nodes on each side: m corresponding to entities, and m corresponding to label lists. Each edge connects a node to a label list in which the true identity of that node lies, and the goal is reduced to finding a matching in this graph: a set of m edges with no common vertices. The method may then pick an arbitrary matching from this graph, which corresponds to assigning the label lists to their matching nodes.

In one embodiment, the current method uses a search procedure that arbitrarily picks a node, and assigns an arbitrary matching list to it, then repeats this procedure after deleting all edges which are incident on the two matched vertices.

It is observed that in the prefix pattern case associating a node with a label list still leaves at least k−1 feasible assignments for other nodes. So the first k−1 steps permit arbitrary choices, until there are some vertices which have only a single edge incident on them, forcing these assignments to be made. This ensures that this approach can find a satisfying assignment for each class, and in time polynomial in m for each class. In addition, it is observed that the search procedure for the full pattern case is considerably simpler. Specifically, all nodes in the same class are given the same label list, containing the set of all labels in the class.

In one embodiment, the label list approaches discussed above provide privacy for applications in which an attacker has background knowledge to find the true identity of no more than a small number (fewer than k−1) of the nodes. However, an attacker may have complete or near complete information about one node and partial information about other related nodes. For example, the attacker may attempt to combine the known information with data anonymized by the uniform list approach to infer more about the interactions between those nodes for which partial information is known. Within a social network, a user may be allowed to see all of his/her own interactions and also some properties of the entities that she/he has interacted with (for example, the attacker may be able to see the age and location of OSN "friends"). Using the exact knowledge of his/her own number of interactions, an attacker may then be able to identify which node in G' corresponds to his/her own data. Furthermore, the attacker may see which nodes the attacker is connected to via interactions, and potentially identify those nodes. For example, if the attacker v has only one friend in Alaska, and of all the classes containing nodes which share an interaction with v, only one has nodes located in Alaska, then the attacker has found the node corresponding to that friend. The attacker may now learn about the interactions of these nodes, and in particular, about interactions amongst them (such as which have exchanged email).

In one embodiment, the current method increases the amount of masking of data at the expense of utility in order to preclude attacks which leverage greater amounts of background information. Specifically, the current method provides an m-partitioning approach, which partitions the nodes into classes and then instead of releasing the full edge information, the method releases only the number of edges between (and within) each subset. For example, given a rich communication graph G, a partition anonymization of G consists of a collection of sets of nodes C which partition the vertex set V. The partition anonymization is a (weighted) bipartite graph G' on C and I, wherein the weight of edge (C,i) is $|\{v \in C | (v,i) \in E\}|$, the number of edges between nodes in class C and interaction i. This is an m-partition if for each $C \in C$, $|C| \geq m$.

Figure 4:
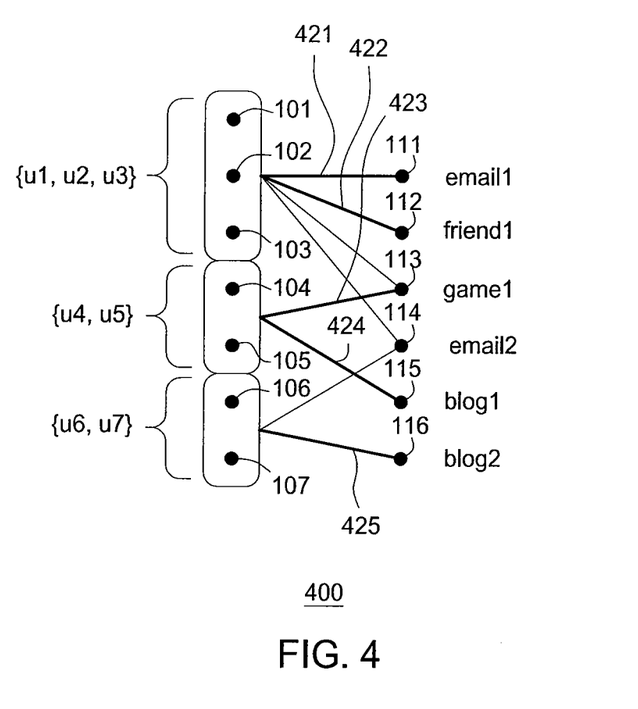
FIG. 4 illustrates a 2-partition example.

FIG. 4 illustrates a 2-partition example 400. The user and interaction entities are as shown in FIG. 1. In FIG. 4, V is partitioned into $\{u_1, u_2, u_3\}, \{u_4, u_5\}$ and $\{u_6, u_7\}$. In FIG. 4, the "thick" lines 421-425 indicate double edges (e.g., edges for the case when there are two edges linking the interaction on the right to members of the class on the left). Under the partitioning approach, even if an attacker is somehow able to identify which node represents an entity, or a particular interaction, there is still uncertainty about other interactions.

The safety condition described above for the label lists is equally applicable for this approach. Although the exact connections between nodes and interactions are not revealed by the partition, the safety condition is needed to prevent the attacker using the density of the graph to conclude that entities must participate in a particular interaction. For instance, the example in FIG. 4 does not satisfy the condition. An attacker can infer that $u_6$ and $u_7$ are both linked to the $blog_2$ interaction. Likewise, if between two classes of size m there were $m^2$ friend interactions (and each node pair can participate in at most one friend interaction), then the attacker can infer that there are friend relations between each pair of nodes drawn from the two different classes. The safety condition is then needed to prevent such inferences.

In one embodiment, the current method uses the m-partition approach with the safety condition. Consequently, an attacker who observes data published using the m-partition approach and who has no background knowledge about the original data can learn nothing about which entities have participated in an interaction with certainty, provided m>1. Furthermore, an attacker with background knowledge about fewer than m entities cannot deduce anything further from data anonymized into an m-partition with the safety condition.

In particular, the above m-partition approach with the safety condition extends privacy to the case where a user in a social network knows a certain amount of information about themselves and about their OSN friends. Under the partition anonymization, the attacker is unable to use this information to learn anything additional from the anonymized data. Furthermore, the safety condition holds even when they interact with a large number of other users, since the safety condition will place each of these in a separate class, preventing further inference. The m-partition approach is also resilient to attacks based on other information. For example, an attacker who knows that an entity has a certain unique degree cannot use that knowledge to identify any more information about the entity.

In one embodiment, the result of the above anonymization is a graph G' linking nodes to interactions, with a list of possible labels for each node. Given such masked data, an end user may then perform a desired analysis. For example, an end user may issue a query. The query may then be evaluated over G' to generate a response. The response is consistent with an anonymized data and may be used by the end user.

The above anonymization methods placed entities together in classes to mask their identities while leaving interactions unmasked. This is because one objective is to disguise in which interactions an entity participates. While one is concerned with the privacy of individuals, in general there is less concern about the privacy of inanimate objects such as single emails or friendship relations per se. However, for some applications, it may be beneficial to also create classes of interactions, which mask their identity. For instance, there may be a benefit for masking additionally correlations between certain interactions. For example, in the uniform list approach, it is possible to see which interactions share a common participant, even though the identity of that participant remains hidden.

In one embodiment, the current method partitions interactions into classes and applies a label list or an m-partition anonymization on interactions such that correlations (as described above) are hidden. The same safety condition described for protecting the privacy of user entities may be applied for guaranteeing privacy for interaction groups. Furthermore, the safety condition can hold on one set irrespective of how the other set is divided up. For example, the safely condition on interaction groups may hold regardless of how the user entities are divided, or vice versa. More generally, other combinations of approaches are possible: such as applying the partition approach on the entities and the label list approach on the interactions.

In the above description, the communication graph has been assumed to be undirected. However, such graphs may contain directional information that may be useful. For example, a user may issue a query that necessitates knowing that an email was sent from one person to another, or a set of others; or one user has subscribed to the blog of another (a "following" relation).

In one embodiment, the directional information may be encoded as directed edges. Directed graphs may be anonymized using the above techniques without losing the directionality with the same guarantees. Including directions may give more chance for an attacker with copious background information to break the privacy, but it remains safe against attackers with bounded knowledge.

In the above anonymizations, since the mapping from nodes to entities is masked, the attributes corresponding to the node are also masked. This is because the attributes are associated with the entities. However, some attributes (such as gender or country) may be associated with the nodes, instead of with the entities, as long as these labels do not distinguish nodes as described earlier. Hence, with a minimal loss of privacy, the utility of the graphs in responding to queries that access these attributes may be improved. In one embodiment, the data owner determines a level of masking of attributes and associates the attributes with nodes such as to improve responses to queries which access these attributes.

Figure 5:
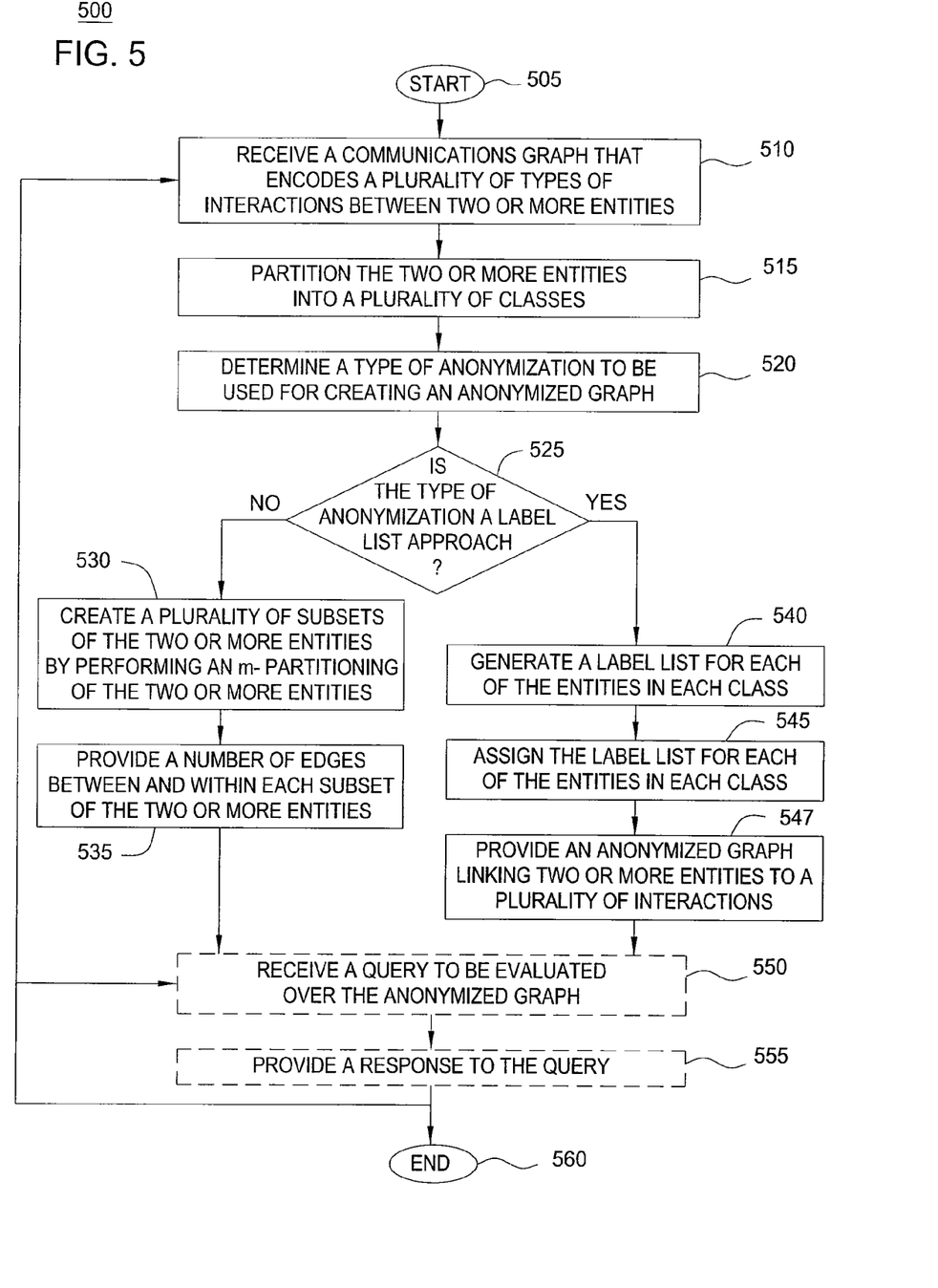
FIG. 5 illustrates a flowchart of a method for providing anonymization of a graph for network data.

FIG. 5 illustrates a flowchart of the method 500 for providing anonymization of data, e.g., graph data. For example, a data owner (e.g., a network service provider, a social networking service provider, a host of a social networking service, etc.) may enable an application server to interact with users and to provide anonymized data. Method 500 starts in step 505 and proceeds to step 510.

In step 510, method 500 receives a communications graph that encodes a plurality of types of interactions between two or more entities. For example, a rich communication graph G that encodes a variety of interactions between a set of user entities V may be received. For example, for online social networks, V may represent the members of the network. The interactions between them may be, for instance, that an email or an IM was sent between a pair, a game was played among four players, or a large group declared their support for a political candidate. These interactions may then be represented by a hypergraph, where each hyperedge consists of the set of entities involved in that interaction.

In step 515, method 500 partitions the two or more entities into a plurality of classes. For example, the method may use a greedy algorithm for partitioning the two or more entities into classes. For example, the method may begin by picking one entity to start the first class. The method may then insert each entity, in turn, in the first class that has fewer members than a predetermined class size (e.g., m members per class) provided that performing this insertion would not violate the safety condition. If no class can be found which satisfies the safety condition and/or all of the already defined classes have at least m members, then the method may define a new class for the current entity. Trivially, this class satisfies the safety condition.

In one embodiment, the method verifies conformance to the safety condition by first maintaining for each class, a list of all nodes which have an interaction with any member of a group. When testing whether it is safe to insert a first entity, the method may then verify that neither the first entity nor any other entity that shares an interaction with the first entity is present in the list of nodes which have an interaction with any member of the group.

In step 520, method 500 determines a type of anonymization to be used for creating an anonymized graph. For example, the method may use or apply either a label list approach or an m-partition approach for anonymizing the graph as discussed above.

In step 525, method 500 determines if the type of anonymization is a label list approach. If the type of anonymization is a label list approach, the method proceeds to step 540. Otherwise, the method proceeds to step 530.

In step 530, method 500 creates a plurality of subsets of the two or more entities by performing an m-partitioning of the two or more entities. For example, if there are seven users of a social network, the method may partition the user nodes into three subsets wherein a subset contains three nodes and the remaining two subsets each contain two members.

In step 535, method 500 provides a number of edges between and within each subset of the two or more entities. For example, the method may perform the anonymization using an m-partitioning approach that partitions the entities into classes and then provide the number of interactions at the level of classes, rather than individual entities. The method then proceeds to step 550.

In step 540, method 500 generates a label list for each of the entities in each class. For example, the method may generate a list of possible labels for each of the entities, among which the true label is guaranteed to lie.

In step 545, method 500 assigns the label list for each of the entities in each class. For example, the method may provide a list of possible labels for each entity, wherein the list of possible labels for each entity includes the actual label of the entity.

In step 547, method 500 provides an anonymized graph linking two or more entities to a plurality of interactions. For example, the method may output a graph that provides the list of labels for each user entity, with the actual label included in the list and then link each user entity to a plurality of interactions. The method then proceeds to step 550.

In an optional step 550, method 500 receives a query to be evaluated over the anonymized graph. For example, a user interested in performing a research may issue a query.

In an optional step 555, method 500 provides a response to the query. For example, the method may evaluate the query over the anonymized graph and generate a response. The method then ends in step 560.

Alternatively, the method may proceed to step 550 to receive another query, or may return to step 510 to receive another graph.

It should be noted that although not specifically specified, one or more steps of method 500 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 5 that recite a determining operation or involve a decision, do not necessarily require that both branches of the determining operation be practiced. In other words, one of the branches of the determining operation can be deemed as an optional step.

Figure 6:
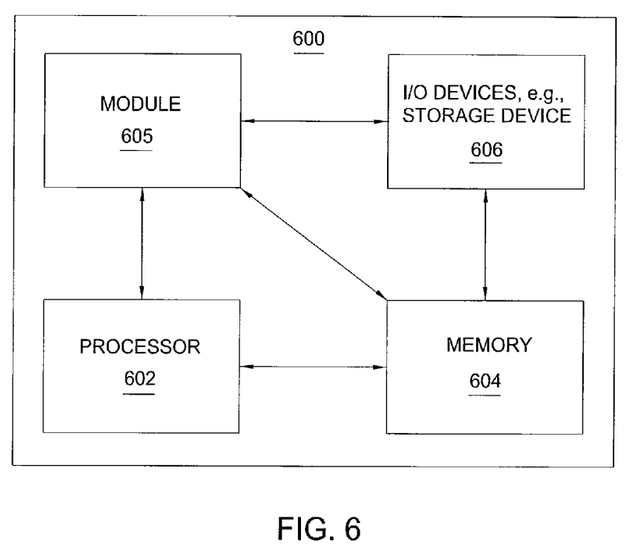
FIG. 6 illustrates a high-level block diagram of a general-purpose computer suitable for use in performing the functions described herein.

FIG. 6 depicts a high-level block diagram of a general-purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for providing anonymization of data, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for providing anonymization of data can be loaded into memory 604 and executed by processor 602 to implement the functions as discussed above. As such, the present method 605 for providing anonymization of data (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an anonymized graph, comprising:
  receiving, by a processor, a communications graph that encodes a plurality of types of interactions between a plurality of user entities;
  partitioning, by the processor, the plurality of user entities into a plurality of classes;
  applying, by the processor, a type of anonymization to the communications graph, wherein the type of anonymization comprises a label list approach that allocates a label list to each of the plurality of user entities, wherein a plurality of labels in the label list for one of the user entities comprise: labels of other user entities within a same class as the one user entity and a true label for the one user entity; and
  providing, by the processor, the anonymized graph linking two or more of the plurality of user entities to a plurality of interactions, wherein the anonymized graph comprises:
    a first set comprising the plurality of user entities;
    a second set comprising the plurality of interactions; and
    a plurality of edges linking two or more of the plurality of user entities in the first set to an interaction in the second set.

2. The method of claim 1, further comprising receiving a query to be evaluated over the anonymized graph; and
  providing a response to the query.

3. The method of claim 1, wherein the label list approach comprises an arbitrary approach, wherein the arbitrary approach picks a user entity and generates the label list that is allocated to the user entity arbitrarily, among which the true label of the user entity is guaranteed to lie.

4. The method of claim 3, wherein the arbitrary approach uses a guideline for restricting the label list, wherein the guideline comprises avoiding assigning a set of labels to a set of nodes that have a dense interconnection pattern.

5. The method of claim 1, wherein the label list is generated by a uniform list approach, wherein the uniform list approach is an approach that comprises:
  partitioning the two or more user entities into subsets of classes of a size of a first number m; and
  forming a collection of in label lists for each of the subset of classes, wherein the collection of in label lists is formed based on an integer pattern $p=\{p_0, p_1 \ldots p_{k-1}\}$ which is a subset of $\{0 \ldots m-1\}$ of a size exactly a second number k.

6. The method of claim 5, wherein the uniform list approach uses a prefix pattern, wherein the prefix pattern is a list defined by pattern $p=\{0, 1, 2, \ldots k-1\}$.

7. The method of claim 5, wherein the uniform list approach uses a full pattern, wherein the full pattern is a list defined by pattern $p=\{0, 1, 2, \ldots m-1\}$.

8. The method of claim 1, further comprising:
  partitioning the plurality of types of interactions into two or more classes; and
  performing an anonymization on the plurality of types of interactions.

9. The method of claim 8, wherein the anonymization on the plurality of types of interactions is performed by using a label list approach type of anonymization.

10. The method of claim 8, wherein the anonymization on the plurality of types of interactions is performed by using an m-partition approach type of anonymization.

11. The method of claim 1, wherein a level of masking of attributes associated with the plurality of user entities is determined by a data owner.

12. A tangible computer-readable medium storing a plurality of instructions which, when executed by a processor, cause the processor to perform operations for providing an anonymized graph, the operations comprising:
  receiving a communications graph that encodes a plurality of types of interactions between a plurality of user entities;
  partitioning the plurality of user entities into a plurality of classes; and
  applying a type of anonymization to the communications graph, wherein the type of anonymization comprises a label list approach that allocates a label list to each of the user entities, wherein a plurality of labels in the label list for one of the user entities comprise: labels of other user entities within a same class as the one user entity and a true label for the one user entity; and
  providing the anonymized graph linking two or more of the plurality of user entities to a plurality of interactions, wherein the anonymized graph comprises:
    a first set comprising the plurality of user entities;
    a second set comprising the plurality of interactions; and a plurality of edges linking two or more of the plurality of user entities in the first set to an interaction in the second set.

13. The tangible computer-readable medium of claim 12, further comprising
receiving a query to be evaluated over the anonymized graph; and
providing a response to the query.

14. The tangible computer-readable medium of claim 12, wherein the label list approach comprises an arbitrary approach, wherein the arbitrary approach picks a user entity and generates the label list that is allocated to the user entity arbitrarily, among which the true label of the user entity is guaranteed to lie.

15. The tangible computer-readable medium of claim 14, wherein the arbitrary approach uses a guideline for restricting the label list, wherein the guideline comprises avoiding assigning a set of labels to a set of nodes that have a dense interconnection pattern.

16. The tangible computer-readable medium of claim 12, wherein the label list is generated by a uniform list approach, wherein the uniform list approach is an approach that comprises:
partitioning the two or more user entities into subsets of classes of a size of a first number m; and
forming a collection of m label lists for each of the subset of classes, wherein the collection of m label lists is formed based on an integer pattern $p=\{p_0, p_1, \ldots, p_{k-1}\}$ which is a subset of $\{0 \ldots m-1\}$ of a size exactly a second number k.

17. The tangible computer-readable medium of claim 16, wherein the uniform list approach uses a prefix pattern, wherein the prefix pattern is a list defined by pattern $p=\{0, 1, 2, \ldots k-1\}$.

18. The tangible computer-readable medium of claim 16, wherein the uniform list approach uses a full pattern, wherein the full pattern is a list defined by pattern $p=\{0, 1, 2, \ldots m-1\}$.

19. The tangible computer-readable medium of claim 12, further comprising:
partitioning the plurality of types of interactions into two or more classes; and
performing an anonymization on the plurality of types of interactions.

20. An apparatus for providing an anonymized graph, comprising:
a processor; and
a computer-readable medium storing a plurality of instructions which, when executed by the processor, cause the processor to perform operations, the operations comprising:
receiving a communications graph that encodes a plurality of types of interactions between a plurality of user entities;
partitioning the plurality of user entities into a plurality of classes;
applying a type of anonymization to the communications graph, wherein the type of anonymization comprises a label list approach that allocates a label list to each of the user entities, wherein a plurality of labels in the label list for one of the user entities comprise: labels of other user entities within a same class as the one user entity and a true label for the one user entity; and
providing the anonymized graph linking two or more of the plurality of user entities to a plurality of interactions, wherein the anonymized graph comprises:
a first set comprising the plurality of user entities;
a second set comprising the plurality of interactions; and
a plurality of edges linking two or more of the plurality of user entities in the first set to an interaction in the second set.

* * * * *